No. 12,776. REISSUED APR. 7, 1908.

A. OPSAL.

PULLEY BLOCK.

APPLICATION FILED JAN. 6, 1908.

WITNESSES:

A. D. Gerking

Cecil Long

INVENTOR:

Andrew Opsal by F. J. Geisler

ATT'Y.

THE NORRIS PETERS CO., WASHINGTON, D. C.

UNITED STATES PATENT OFFICE.

ANDREW OPSAL, OF PORTLAND, OREGON, ASSIGNOR TO OPSAL LUBRICATING COMPANY, OF OAKLAND, CALIFORNIA, A CORPORATION OF CALIFORNIA.

PULLEY-BLOCK.

No. 12,776. Specification of Reissued Letters Patent. Reissued Apr. 7, 1908.

Original No. 845,041, dated February 19, 1907, Serial No. 294,232. Application for reissue filed January 6, 1908. Serial No. 409,597.

*To all whom it may concern:*

Be it known that I, ANDREW OPSAL, a citizen of the United States, and a resident of the city of Portland, in the county of Multnomah and State of Oregon, have invented a new and useful Improvement in Pulley-Blocks, of which the following is a specification, reference being had to the accompanying drawings as constituting a part thereof.

This invention has for its object to provide means by which lubricant may be efficiently retained in the journal-bearing of the sheave, to protect the bearings against grit and dirt, and incidentally to obtain the features and improvements described in the body of the specification, including durability and cheapness of construction.

Figure 1:
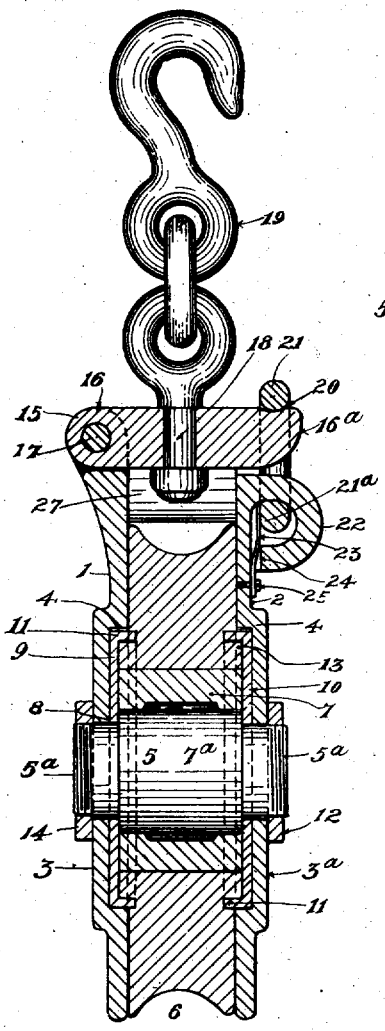
Figure 3:
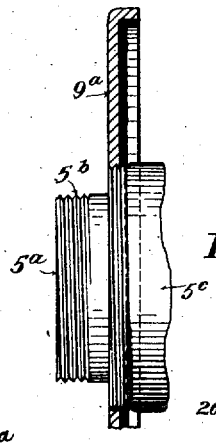
Figure 4:
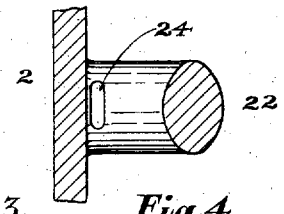
Figure 2:
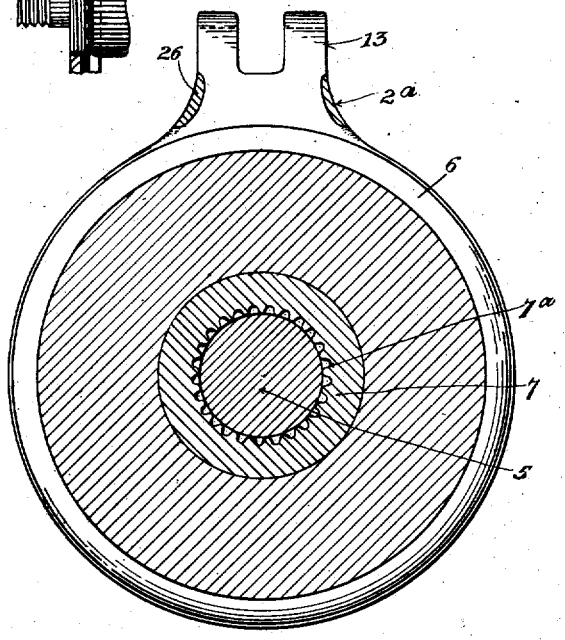

The arrangement and operation of my pulley-block is illustrated in the drawings, in which Figure 1 is a central transverse section of the body of the pulley; Fig. 2 is a central vertical section taken longitudinally through the sheave, showing the rear side of the shell; Fig. 3 is a partial vertical section of a modification; and Fig. 4 is a partial plan section showing details of construction fully explained below.

The numerals designate the parts referred to.

The shell consists of two parts or sides 1, 2, respectively, made with protruding wall portions 3, 3[a], providing room for interior annular chambers 4, and said protruding wall portions being apertured to receive the ends of the axle or pin 5. The sheave 6 is made with a bearing-eye of sufficient diameter to accommodate a bushing or sleeve 7, placed on the axle. The inner annular face of such bushing is provided with an endless series of cavities or flutes 7[a], in which to fill lubricant. The axle 5 is made with reduced ends 5[a], leaving shoulders 8, abutting against the caps 9, 10. But obviously the particular means used for spacing the parts to prevent binding are immaterial, and likewise a bushing, though preferable, is not an indispensable element.

I avoid straight passages from the exterior to the bearing-surfaces to prevent grit getting between the latter. The sides of the sheave 6 to this end are made with bosses 13, encompassed by the peripheral flanges 11 of said caps 9, 10, set in the chambers 4 of the sides of the shell. The sides of the sheave are furthermore made with annular grooves, into which extend said peripheral flanges of the caps 9, 10. The wall-caps 9, 10 may be loosely placed on the ends of the thicker or main body part of the axle or pin 5, or, as shown in Fig. 3, said ends 5[b] of the axle 5[c] may be threaded and the eyes of the caps 9[a] made with corresponding threads. The last described construction of course makes a more effectual barrier to grit. The extremities 5[a] of the axle 5 are threaded in either construction, and nuts 12, 14 are secured thereon to hold the parts in place.

To facilitate the insertion and removal of the cable, the side 1 of the shell is made with perforated knuckles 15, in which is hinged a cross-head 16 by a hinge-pin 17. The cross-head 16 is provided with the usual swivel-eye 18 and a link and hook 19. For the same purpose the extremity of the cross-head 16 may be provided with a concaved cavity 20, in which to seat the upper end of the link 21, secured in a perforated lug 22 on the side 2 of the shell, and to hold the link 21 in place a flat spring 23 may be provided, such spring being affixed to the side 2 by a screw 25, and the free end thereof extending into a cavity 24 therefor made in the lug 22 (see Fig. 4) and bearing against the lower flat surface 21[a] of the link. The rear side 1 of the shell is provided with integral lugs 26, 27, arranged as shown in Fig. 2 and extending across the top of the sheave, so as to prevent the cable running on the latter from fouling with the throat of the pulley.

I claim:

1. In a pulley-block, the combination of a shell the interior faces of which are provided with chambers, an axle-pin secured in said sides, a sheave, mounted on said axle-pin, made with annular grooves in its side faces concentric with its eye, and caps mounted on the pin, in said chambers of the sides of the shell and having peripheral flanges extending into said grooves of the sheave.

2. In a pulley-block, the combination of a shell the interior faces of the sides of which are provided with chambers 4, a pin or axle having reduced ends journaled in said sides, a bushing mounted on said pin, a sheave, mounted on said bushing, made with annular grooves in its side faces concentric with its eye, and caps mounted on the pin, in said chambers 4 of the sides of the shell and having peripheral flanges extending into the grooves in the side faces of the sheave.

3. In a pulley-block, the combination of a shell the interior faces of the sides of which are provided with chambers 4, a pin or axle having reduced ends, a bushing mounted on the pin and made with an endless series of cavities 7[a] for holding lubricant in the eye thereof, a sheave, mounted on said bushing, made with annular grooves in its side faces concentric with its eye, and caps mounted on the pin, in said chambers 4 of the sides of the shell and having peripheral flanges extending into the grooves in the side faces of the sheave.

4. In a pulley-block, the combination of a shell the interior faces of the sides of which are provided with chambers 4, a pin or axle having reduced ends journaled in said sides, a bushing mounted on said pin, a sheave, mounted on said bushing, made with bosses on its side faces encompassing the eye and provided with annular grooves encompassing said bosses, and caps mounted on the pin, in said chambers 4 of the sides of the shell and having peripheral flanges extending into the grooves in the side faces of the sheave.

5. In a pulley-block, the combination of a shell the interior faces of the sides of which are provided with chambers 4, a pin or axle having reduced ends journaled in said sides, a bushing mounted on said pin, a sheave, mounted on said bushing, made with annular grooves in its side faces concentric with its eye, and caps mounted on the pin, in said chambers 4 of the sides of the shell and having peripheral flanges extending into the grooves in the side faces of the sheave, the eyes of the caps and the bearing surfaces therefor on the periphery of the pin being made with threads.

6. A pulley-block comprising a shell the interior faces of the sides of which are provided with chambers 4, a pin or axle having reduced ends journaled in said sides, a bushing mounted on said pin and made with an endless series of cavities 7[a] for holding lubricant in the eye thereof, a sheave, mounted on said bushing and made with annular grooves in its side faces concentric with its eye, and caps mounted on the pin in said chambers 4 of the sides of the shell and having peripheral flanges extending into said grooves of the side faces of the sheave; the eyes of the caps and the bearing-surfaces therefor on the periphery of the pin being made with threads.

ANDREW OPSAL.

Witnesses:
A. D. GERKING,
CECIL LONG.